United States Patent
Raggatt

(10) Patent No.: US 7,270,406 B2
(45) Date of Patent: *Sep. 18, 2007

(54) INK

(75) Inventor: Mairi Elizabeth Raggatt, Summertown (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 305 days.

This patent is subject to a terminal disclaimer.

(21) Appl. No.: 10/520,664

(22) PCT Filed: May 16, 2003

(86) PCT No.: PCT/GB03/02135

§ 371 (c)(1),
(2), (4) Date: Jan. 10, 2005

(87) PCT Pub. No.: WO2004/011562

PCT Pub. Date: Feb. 5, 2004

(65) Prior Publication Data

US 2005/0264628 A1    Dec. 1, 2005

Related U.S. Application Data

(60) Provisional application No. 60/410,809, filed on Sep. 16, 2002.

(30) Foreign Application Priority Data

Jul. 27, 2002    (GB) ................................ 0217448.0

(51) Int. Cl.
*G01D 11/00* (2006.01)
(52) U.S. Cl. ...................... 347/100; 347/95; 106/31.13
(58) Field of Classification Search .................. 37/100, 37/95, 96, 101; 106/31.6, 31.27, 31.13; 523/160
See application file for complete search history.

(56) References Cited

U.S. PATENT DOCUMENTS

| | | | |
|---|---|---|---|
| 3,321,266 A | 5/1967 | Wunderlich et al. | ............ 8/686 |
| 4,204,879 A | 5/1980 | Paskins et al. | .............. 106/311 |
| 5,102,459 A | 4/1992 | Ritter et al. | ............. 106/31.36 |
| 5,183,501 A | 2/1993 | Kawashita et al. | ....... 106/31.44 |
| 5,908,622 A | 6/1999 | Barclay | ....................... 424/93.1 |
| 6,001,161 A | 12/1999 | Evans et al. | ............. 106/31.48 |
| 6,755,903 B2 | 6/2004 | Yamada et al. | .......... 106/31.45 |
| 6,979,364 B2 * | 12/2005 | Wright et al. | ................ 347/100 |
| 2003/0125530 A1 * | 7/2003 | Chino et al. | ................. 534/653 |

FOREIGN PATENT DOCUMENTS

| DE | 651 105 | 10/1937 |
|---|---|---|
| EP | 1 270 676 | 1/2003 |
| JP | 48-89932 | 11/1973 |
| JP | 58-176267 | 10/1983 |
| JP | 10-259331 | 9/1998 |
| JP | 11-5931 | 1/1999 |

OTHER PUBLICATIONS

Hirsch B. et al: "Some new dyes based on 3-amino-1,2,4-triazole derivatives" Sbornik Vedeckych Praci, Vysoka Skola Chemickotechnologicka Pardubice, vol. 44, 1981, pp. 285-290, XP009016260.

Israilov et al: "Spectrophotometric study of triazolyl azo compounds and their use in photometric analysis" Izvestiya Akademii Nauk Tadzhikskoi SSR, Otdelenie, vol. 79, No. 1, 1981, pp. 45-51, XP009016261.

Sheberbachev, K.D. et al: "The Analysis of the Sulfonic Acids of Beta-Naphthol. II" Revue Generale Des Matieres Colorantes, Du Blanchiment, De La Teinture, De L'Impression Et Des Apprets, vol. 39, No. 81-6, 1935, pp. 81-86, XP001154186 p. 82, col. 1.

Caber et al., "Co(II), Ni(II) and Cu(II) Complexes with 3-Arylazo-1,2,4-triazole Dyes", Indian Journal of Textile Research, 11:48-51 (Mar. 1986).

Garg et al., "Synthesis and Spectral Characterization of Complexes of Sodium 2-[4-amino-5-mercapto-3-(1,2,4-triazolylazo)] naphthol-4-sulphonate (AMTN-4S) with Cobalt(II), Nickel(II) and Copper(II)", Synth. React. Inorg. Met.-Org. Chem., 18(7):643-656 (1988).

\* cited by examiner

*Primary Examiner*—Manish S. Shah
(74) *Attorney, Agent, or Firm*—Morgan Lewis & Bockius LLP

(57) ABSTRACT

An ink including:
(a) a metal chelate compound of Formula (1) or salt thereof, wherein M is nickel;

and (b) a liquid medium.

The inks are useful for ink jet printers.

13 Claims, No Drawings

INK

This is a 371 filing of PCT/GB2003/002135, filed May 16, 2003 and claims priority from GB No. 0217448.0, filed Jul. 27, 2002 and U.S. Provisional Application No. 60/410,809, filed Sep. 16, 2002.

This invention relates to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

WO 01/48090 relates to metal chelate azo compounds which comprise a naphthol component and certain heterocyclic groups. WO 01/48090 does not disclose such compounds further substituted by a triazole ring for use in ink formulations.

According to a first aspect of the present invention there is provided an ink comprising:

(a) A metal chelate compound of Formula (1) or salt thereof, wherein M is nickel;

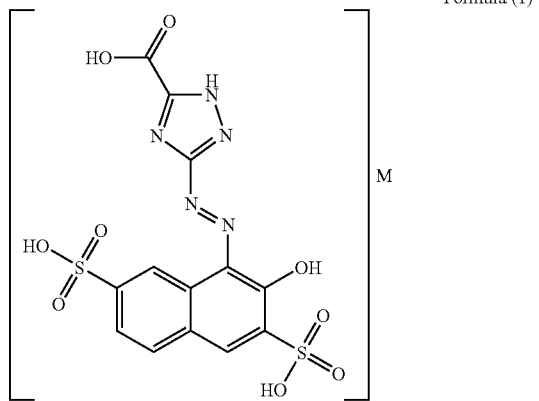

Formula (1)

and (b) a liquid medium.

It is especially preferred that the inks comprising the compound of Formula (1) are magenta in colour.

The inks comprising the compound of Formula (1) provide prints which exhibit a high light-fastness, good fastness to oxidising gases such as ozone and good optical density, particularly when used for ink jet printing. The inks according to the present invention are also highly soluble which improves operability and reduces crusting and nozzle blockage when inks containing the compounds are used in an ink jet printer.

It is especially preferred that the compound of Formula (1) is in the form of a sodium, lithium, potassium, ammonium or substituted ammonium salt, because we have found that these salts provide prints which exhibit a high light-fastness when incorporated into an ink jet printing ink.

The metal chelate compound of Formula (1) or a salt thereof according to the present invention and the inks comprising the compound of Formula (1) also include tautomers thereof, especially tautomers of the triazole ring.

The compound of Formula (1) may be converted into a salt using known techniques. For example, an alkali metal salt of a compound may be converted into a salt with ammonia or an amine by dissolving an alkali metal salt of the dye in water and passing the solution through a column of a suitably modified ion exchange resin.

The inks according to the present invention may be, and preferably are, purified to remove undesirable impurities before they are incorporated into inks for ink jet printing. Conventional techniques may be employed for purification, for example ultrafiltration, reverse osmosis and/or dialysis.

The liquid medium preferably comprises:
(i) water;
(ii) a mixture of water and an organic solvent; or
(iii) an organic solvent free from water.

The number of parts by weight of component (a) of the ink is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts of (a)+(b) is 100 and all parts mentioned herein are by weight.

Preferably component (a) is completely dissolved in component (b). Preferably component (a) has a solubility in component (b) at 20° C. of at least 10%. This allows the preparation of concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cydohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy] ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the metal chelate compound in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

An especially preferred ink comprises:
(i) 1 to 10 parts in total of the compound of Formula (1) or salt thereof;
(ii) 2 to 60, more preferably 5 to 40 parts of water-soluble organic solvent; and
(iii) 30 to 97, more preferably 40 to 85 parts water;

wherein all parts are by weight and the sum of the parts (i)+(ii)+(iii)=100.

When the liquid medium in the ink comprises a mixture of water and an organic solvent; or an organic solvent free from water, component (i) of the ink may comprise a compound of the Formula (1) or salt thereof, as hereinbefore defined.

Preferred low melting solid media have a melting point in the range from 60° C. to 125° C. Suitable low melting point solids include long chain fatty acids or alcohols, preferably those with $C_{18-24}$ chains, and sulphonamides. A compound of Formula (1) may be dissolved in the low melting point solid or may be finely dispersed in it.

The inks according to the present invention may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

The pH of the ink is preferably from 4 to 11, more preferably from 7 to 10.

The viscosity of the ink at 25° C. is preferably less than 50 cP, more preferably less than 20 cP and especially less than 5 cP.

A second aspect of the present invention provides a process for printing an image on a substrate comprising applying thereto by means of an ink jet printer an ink according to the first aspect of the present invention. The preferences for the ink used in this process are as hereinbefore defined in relation to the first aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc.), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A third aspect of the present invention provides a substrate, preferably a paper, an overhead projector slide or a textile material, printed with an ink according to the first aspect of the present invention or by means of the process according to the second aspect of the present invention.

According to a fourth aspect of the present invention there is provided an ink jet printer cartridge comprising a chamber and ink, wherein the ink is present in the chamber and the is as defined in the first aspect of the present invention.

According to an fifth aspect of the present invention there is provided an ink jet printer containing an ink jet printer cartridge, wherein the ink jet printer cartridge is as defined in the fourth aspect of the present invention.

The invention is further illustrated by the following Examples in which all parts and percentages are by weight unless specified otherwise.

EXAMPLE 1

Compound (1) wherein M is Nickel

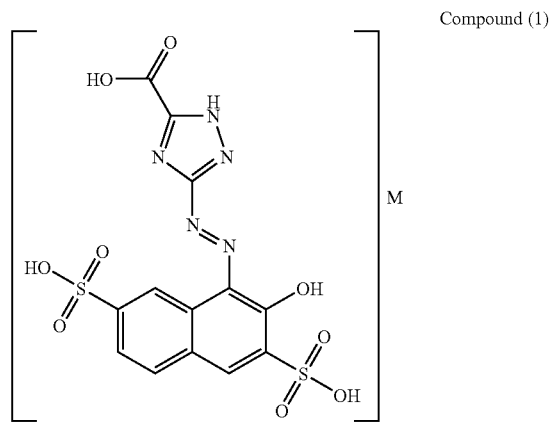

Compound (1)

Stage (a): Preparation of 3-hydroxynaphthalene-2,6-disulfonic Acid

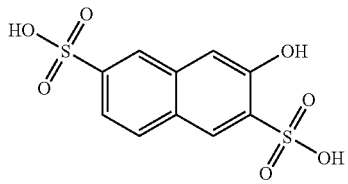

7-Hydroxynaphthalene-2-sulfonic acid (250 g, 1.16 mol) was added in portions to a mixture of concentrated $H_2SO_4$ (950 g) and water (50 g). The mixture was stirred at 110-120° C. for 3 hours, cooled to room temperature, added to a mixture of ice and water (5000 ml) and the product precipitated by the addition of sodium chloride. The resultant slurry was warmed to 90° C. to dissolve the product, stirred for 1 hour at this temperature and then allowed to cool. The product was filtered off and the damp product dissolved in water (3000 ml) at pH 10 by the addition of concentrated sodium hydroxide solution. The solution was then filtered to remove a small amount of insoluble material. The pH of the filtrate was lowered to 7 with concentrated HCl and the product precipitated by the addition sodium chloride. The product was filtered off and dried in a vacuum oven to give 117 g of a cream solid (68% yield).

Stage (b):

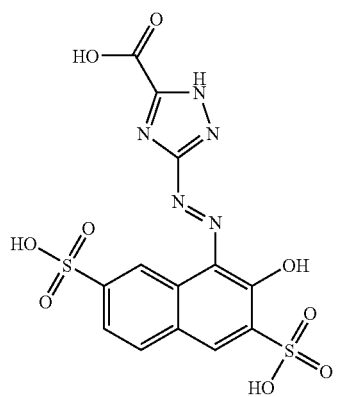

3-Amino-1,2,4-triazole-5-carboxylic acid hydrate (3.84 g, 0.03 mol) was suspended in water (180 ml) and dissolved by the addition of 2M NaOH to pH 8. Sodium nitrite (2.27 g, 0.033 mol) was added and the solution stirred until the sodium nitrite had dissolved.

The mixture was then added dropwise to a cooled mix of ice-water (150 g) and concentrated HCl (10 ml) at 0-5° C., the mixture was stirred for 30 minutes at 0-5° C. and then excess nitrous acid was removed by adding sulphamic acid. The diazo suspension was added slowly to a solution of 3-hydroxynaphthalene-2,6-disulfonic acid (13.4 g, 0.03 mol) in water (300 ml) at pH 7-8 (2N NaOH) and cooled below 5° C. The reaction mixture was then stirred at 0-5° C. for one further hour, the product was precipitated by acidification to pH 4 with 2N HCl and collected by filtration. The product was washed with 15% brine solution and then dried in a vacuum desiccator to give 20 g of an orange solid (60% yield).

Stage (c): Preparation of Compound (1)

A solution of nickel acetate tetrahydrate (2.5 g, 0.01 mol) in water (20 ml) was added dropwise to the product from stage (b) (7.43 g, 0.01 mol) dissolved in water (100 ml) at pH 7-8 (2N NaOH). The reaction mixture was stirred for 2 hours at 20° C., dialysed using SpectraPor membrane tubing (molecular weight cut off 3500) to low conductivity (<100 μs). Compound (1) was obtained by evaporation under reduced pressure to afford a dark solid (5 g). Analysis by mass spectrometry found m/z 499 $(M-H)^-$. Requires $M^+=500$.

EXAMPLE 2

Inks

The inks described in Tables I and II may be prepared wherein the Compound described in the first column is the Compound made in Example 1. Numbers quoted in the second column onwards refer to the number of parts of the relevant ingredient and all parts are by weight. The inks may be applied to paper by thermal or piezo ink jet printing.

The following abbreviations are used in Table I and II:
PG=propylene glycol
DEG=diethylene glycol
NMP=N-methylpyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE I

| Compound | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 1 | 3.0 | 90 |  | 5 | 5 |  | 0.2 |  |  |  |  |  |
| 1 | 10.0 | 85 | 3 |  | 3 | 3 |  |  | 5 | 1 |  |  |
| 1 | 2.1 | 91 |  | 8 |  |  |  |  |  |  |  | 1 |
| 1 | 3.1 | 86 | 5 |  |  |  |  | 0.2 | 4 |  |  | 5 |

TABLE I-continued

| Compound | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 1.1 | 81 | | | 9 | | 0.5 | 0.5 | | | 9 | |
| 1 | 2.5 | 60 | 4 | 15 | 3 | 3 | | | 6 | 10 | 5 | 4 |
| 1 | 5 | 65 | | 20 | | | | | 10 | | | |
| 1 | 2.4 | 75 | 5 | 4 | | 5 | | | | 6 | | 5 |
| 1 | 4.1 | 80 | 3 | 5 | 2 | 10 | | 0.3 | | | | |
| 1 | 3.2 | 65 | | 5 | 4 | 6 | | | 5 | 4 | 6 | 5 |
| 1 | 5.1 | 96 | | | | | | | | 4 | | |
| 1 | 10.8 | 90 | 5 | | | | | | 5 | | | |
| 1 | 10.0 | 80 | 2 | 6 | 2 | 5 | | | 1 | | 4 | |
| 1 | 1.8 | 80 | | 5 | | | | | | | 15 | |
| 1 | 2.6 | 84 | | | 11 | | | | | | 5 | |
| 1 | 3.3 | 80 | 2 | | | 10 | | | | 2 | | 6 |
| 1 | 12.0 | 90 | | | | 7 | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE II

| Compound | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 1 | 9.0 | 90 | | 5 | | | | | | 1.2 | | 5 |
| 1 | 1.5 | 85 | 5 | 5 | | 0.15 | 5.0 | 0.2 | | | | |
| 1 | 2.5 | 90 | | 6 | 4 | | | | | 0.12 | | |
| 1 | 3.1 | 82 | 4 | 8 | | 0.3 | | | | | | 6 |
| 1 | 0.9 | 85 | | 10 | | | | | 5 | 0.2 | | |
| 1 | 8.0 | 90 | | 5 | 5 | | | 0.3 | | | | |
| 1 | 4.0 | 70 | | 10 | 4 | | | | 1 | | 4 | 11 |
| 1 | 2.2 | 75 | 4 | 10 | 3 | | | | 2 | | 6 | |
| 1 | 10.0 | 91 | | | 6 | | | | | | 3 | |
| 1 | 9.0 | 76 | | 9 | 7 | | 3.0 | | | 0.95 | 5 | |
| 1 | 5.0 | 78 | 5 | 11 | | | | | | | 6 | |
| 1 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | | 10 | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | 8 | | 12 | | |
| 1 | 10 | 80 | | | 10 | | | | | | | |

The invention claimed is:

1. An ink comprising:
   (a) a metal chelate compound of Formula (1) or salt thereof, wherein M is nickel;

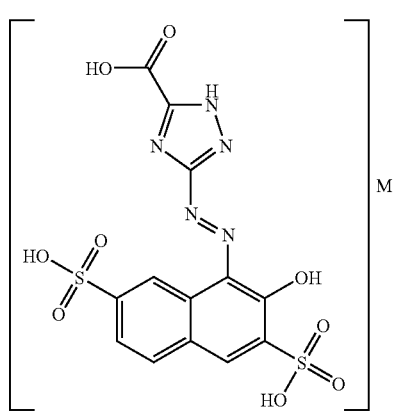

Formula (1)

and (b) a liquid medium.

2. An ink according to claim 1 wherein the liquid medium comprises a mixture of water and an organic solvent.

3. An ink according to claim 1 or 2 comprising
   (i) 1 to 10 parts of the compound of Formula (1) or salt thereof;
   (ii) 2 to 60 parts of water-soluble organic solvent; and
   (iii) 30 to 97 parts water;
   wherein all parts are by weight and the sum of parts (i)+(ii)+(iii) =100.

4. A process for printing an image on a substrate comprising applying thereto by means of an ink jet printer an ink according to claim 1 or claim 2.

5. A substrate printed with an ink according to claim 1 or 2.

6. An ink jet printer cartridge comprising a chamber and ink, wherein the ink is present in the chamber and the ink is as defined in claim 1 or 2.

7. An ink jet printer containing an ink printer cartridge, wherein the ink jet printer cartridge is as defined in claim 6.

8. A process for printing an image on a substrate comprising applying thereto by means of an ink jet printer an ink according to claim 3.

9. An ink jet printer cartridge comprising a chamber and ink, wherein the ink is present in the chamber and the ink is as defined in claim 3.

10. An ink according to claim 1 or 2 which has a viscosity at 25° C. of less than 50 cP.

11. An ink according to claim 1 or 2 which has a viscosity at 25° C. of less than 5 cP.

12. An ink according to claim 1 or 2 wherein the compound of Formula (1) is in the form of a sodium, lithium, potassium, ammonium or substituted ammonium salt.

13. An ink according to claim 1 or 2 wherein the compound of Formula (1) has been purified by ultrafiltration, reverse osmosis and/or dialysis to remove undesirable impurities before incorporation into the ink for ink-jet printing.

* * * * *